US011906119B1

(12) United States Patent
Yang

(10) Patent No.: US 11,906,119 B1
(45) Date of Patent: Feb. 20, 2024

(54) DUAL-BEAD RUBBER-COVERED STRING LIGHT

(71) Applicant: Linhai Lize Photoelectric Technology Co., Ltd., Taizhou (CN)

(72) Inventor: Chengzhuo Yang, Taizhou (CN)

(73) Assignee: Linhai Lize Photoelectric Technology Co., Ltd., Taizhou (CN)

( * ) Notice: Subject to any disclaimer, the term of this patent is extended or adjusted under 35 U.S.C. 154(b) by 0 days.

(21) Appl. No.: 18/086,708

(22) Filed: Dec. 22, 2022

(51) Int. Cl.
*F21S 4/26* (2016.01)
*F21V 23/06* (2006.01)
*F21V 23/04* (2006.01)

(52) U.S. Cl.
CPC ................ *F21S 4/26* (2016.01); *F21V 23/04* (2013.01); *F21V 23/06* (2013.01)

(58) Field of Classification Search
CPC ........ F21V 23/06; F21V 23/04; F21V 31/005; F21V 23/007; F21S 4/26; F21S 4/20–24
See application file for complete search history.

(56) References Cited

FOREIGN PATENT DOCUMENTS

| | | | | |
|---|---|---|---|---|
| CN | 204201595 U | * | 3/2015 | |
| CN | 214172003 U | * | 9/2021 | |
| CN | 214172003 U | | 9/2021 | |
| CN | 216243799 U | | 4/2022 | |
| CN | 217519706 U | | 9/2022 | |
| WO | WO-2013086680 A1 | * | 6/2013 | ................ F21S 4/22 |

* cited by examiner

*Primary Examiner* — Anabel Ton

(57) ABSTRACT

The present disclosure discloses a light fixture and aims to provide a dual-bead rubber-covered string light. According to a technical solution, the dual-bead rubber-covered string light includes a plug, a wire, and light sources, the light sources are connected to the wire, a tail end of the wire is connected to the removable plug, a rubber wire conduit wrapping the wire is disposed on an outer wall of the wire, rubber beads wrapping the light sources by hot melting are disposed outside the light sources, and a ratio of a width of each rubber bead to a distance between the rubber beads is 1/6. The stability effect is strengthened on the basis of an original break-proof effect of the rubber wire conduit, such that the dual-bead rubber-covered string light is not prone to break even in long-term use or when frequently bent.

7 Claims, 6 Drawing Sheets

DUAL-BEAD RUBBER-COVERED STRING LIGHT

TECHNICAL FIELD

The present disclosure relates to a light fixture, in particular to a dual-bead rubber-covered string light.

BACKGROUND

A rubber-covered string light is a kind of light used for lighting and catering to festive atmospheres.

An existing rubber-covered string light has some defects in use as follows: 1. The existing rubber-covered string light is basically in a single-bead type, which makes the rubber-covered string light not rich enough in expression form and poor in glowing effect. 2. In long-term use, the existing rubber-covered string light is prone to break when bent, and wires are exposed accordingly, which affects the service life of the string light and even causes safety hazards. 3. The existing rubber-covered string light basically does not have various lighting modes and is too simplex in lighting mode. Even if the existing rubber-covered string light has various lighting modes, a method to control the lighting modes is relatively complex.

SUMMARY

In view of the defects in the prior art, the present disclosure aims to provide a dual-bead rubber-covered string light with lighting modes convenient to control and a break-proof function.

In order to realize the above objective, the technical solution according to the present disclosure is as follows: a dual-bead rubber-covered string light includes a plug, a wire, and light sources, the light sources are connected to the wire, a tail end of the wire is connected to the removable plug, a rubber wire conduit wrapping the wire is disposed on an outer wall of the wire, rubber beads wrapping the light sources by hot melting are disposed outside the light sources, and a ratio of a width of each rubber bead to a distance between the rubber beads is 1/6.

The present disclosure is further set as: a reinforcing strip arranged as a spiral ring is disposed on an inner wall of the rubber wire conduit.

The present disclosure is further set as: a middle part of each rubber bead bulges, two ends of each rubber bead are flat, and each rubber bead is elliptical.

The present disclosure is further set as: the rubber beads are transparent or semitransparent.

The present disclosure is further set as: the two wrapping ends of each rubber bead wrap corresponding ends of the rubber wire conduit.

The present disclosure is further set as: the light sources are evenly disposed on the wire, and each light source is dual beads.

The present disclosure is further set as: the plug is provided with an integrally-molded binding post, the tail end of the wire is provided with a connector, and the connector is capable of being plugged into the binding post in a matched manner; and an outer wall of the binding post is provided with a thread, a fastening sleeve is movably fixed to the connector, and an inner wall of the fastening sleeve is provided with an internal thread capable of being connected to the binding post in a rotary fit manner.

The present disclosure is further set as: the connector is provided with a groove along an outer wall, a sealing bulb tube is disposed in the groove, a reinforcing bulb tube is disposed in the sealing bulb tube, and a gap is reserved between the reinforcing bulb tube and the sealing bulb tube.

The present disclosure is further set as: the plug is provided with a button capable of switching lighting modes of the light sources.

The present disclosure has the following beneficial effects:

1. Compared with existing rubber-covered string lights, the dual-bead rubber-covered string light according to the present disclosure are of a dual-bead type, such that the produced string light has richer expression forms and desirable glowing effect.
2. The dual-bead rubber-covered string light according to the present disclosure has a break-proof effect. The stability effect is strengthened on the basis of an original break-proof effect of the rubber wire conduit, such that the dual-bead rubber-covered string light is not prone to break even in long-term use or when frequently bent, and the service life of the dual-bead rubber-covered string light is effectively prolonged.
3. By means of the button on the plug, the string light can be controlled to realize various lighting modes, and a control method is simple and easy to implement.
4. The present disclosure has simple structure, easy production and handy operation, and overcomes the defects of existing rubber-covered string lights.

Figure 1:
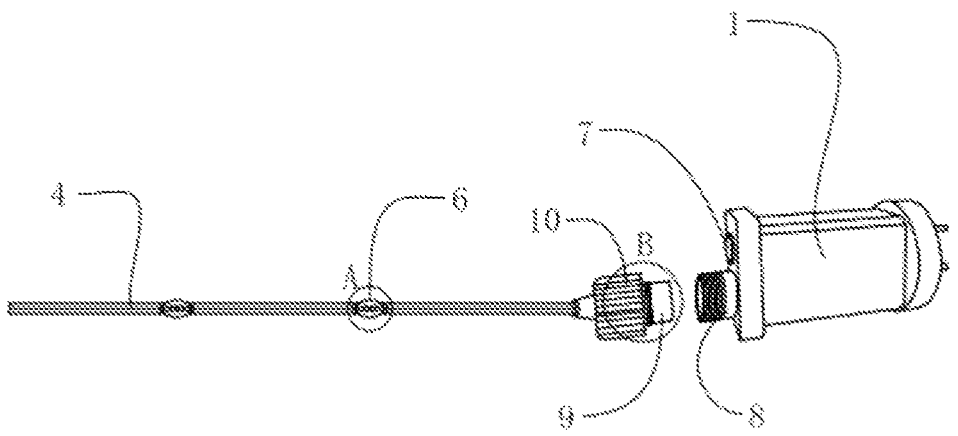
FIG. 1 is a structural diagram of a dual-bead rubber-covered string light according to the present disclosure.
Figure 2:
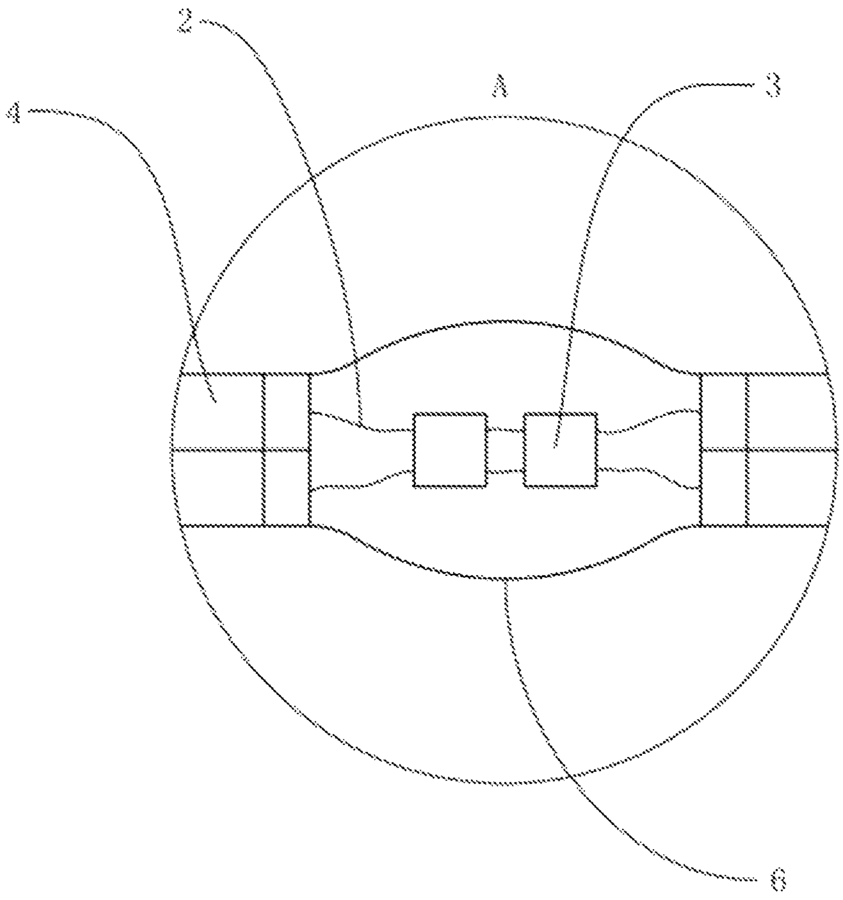
FIG. 2 is a partially enlarged view of A of a dual-bead rubber-covered string light according to the present disclosure.
Figure 3:
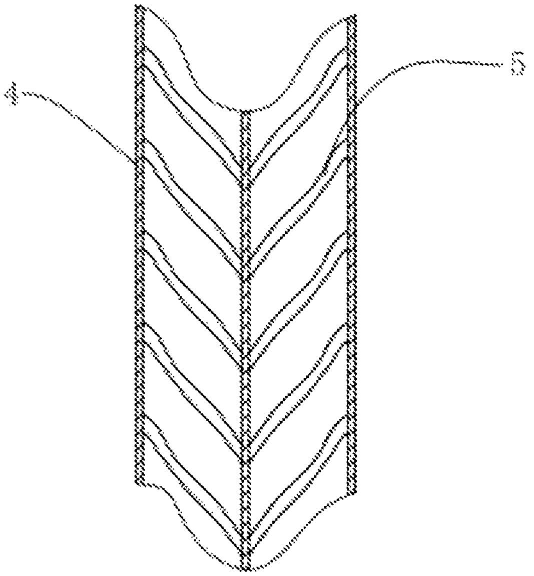
FIG. 3 is a cross-sectional view of a rubber wire conduit of a dual-bead rubber-covered string light according to the present disclosure.
Figure 4:
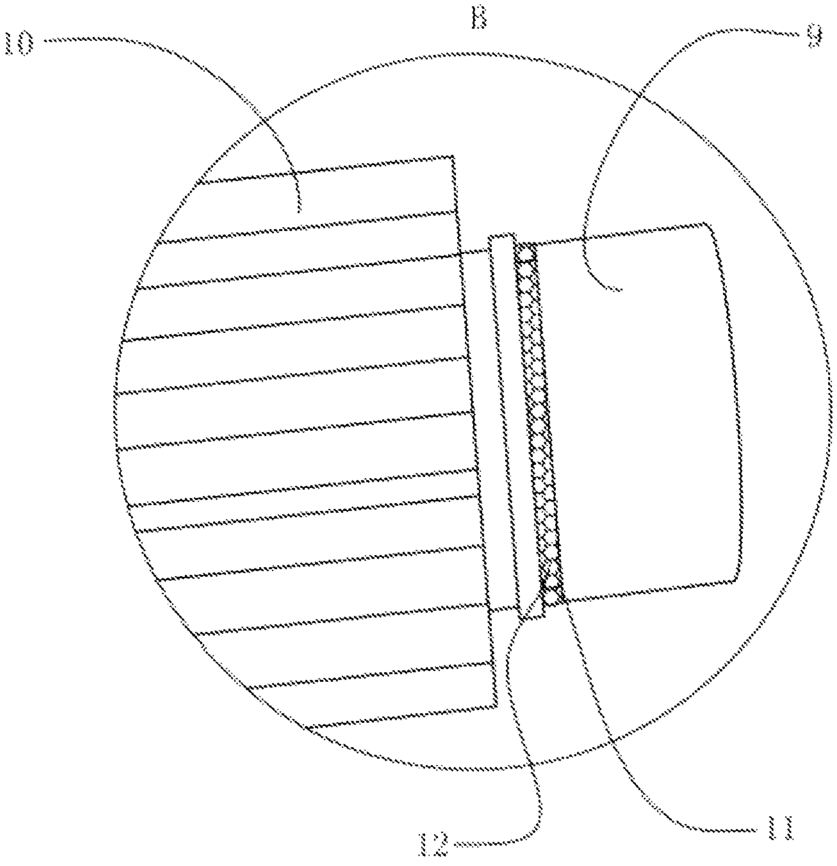
FIG. 4 is a partially enlarged view of B of a dual-bead rubber-covered string light according to the present disclosure.
Figure 5:
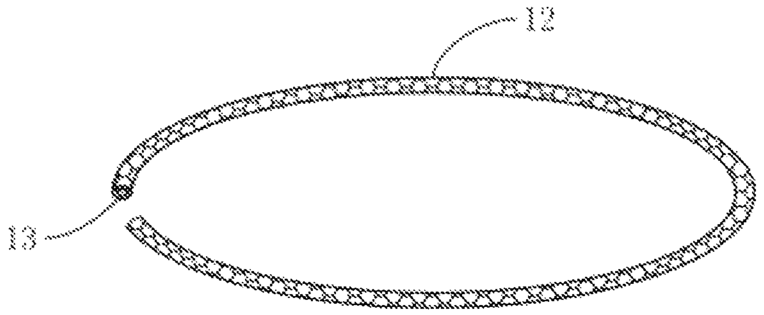
FIG. 5 is a structural diagram of a sealing bulb tube of a dual-bead rubber-covered string light according to the present disclosure.
Figure 6:
FIG. 6 is a connection structure diagram of a dual-bead rubber-covered string light according to the present disclosure.

Reference numerals in FIG. 1 to FIG. 6: 1. Plug; 2. Wire; 3. Light source; 4. Rubber wire conduit; 5. Reinforcing strip; 6. Rubber bead; 7. Button; 8. Binding post; 9. Connector; 10. Fastening sleeve; 11. Groove; 12. Sealing bulb tube; and 13. Reinforcing bulb tube.

DETAILED DESCRIPTION OF THE EMBODIMENTS

A dual-bead rubber-covered string light according to an embodiment of the present disclosure is further illustrated with reference to FIG. 1 to FIG. 6.

As shown in FIG. 1 to FIG. 6, a dual-bead rubber-covered string light includes a plug 1, a wire 2, and light sources 3. The light sources 3 are connected to the wire 2. A tail end of the wire 2 is connected to the removable plug 1. A rubber wire conduit 4 wrapping the wire 2 is disposed on an outer wall of the wire 2. Rubber beads 6 wrapping the light sources 3 by hot melting are disposed outside the light sources 3. A ratio of a width of each rubber bead 6 to a distance between the rubber beads 6 is 1/6, which achieves an optimal illumination effect and visual effect. If the ratio is greater than 1/6, every two light sources 3 are too close, and a glowing effect is too bright, changing the glowing effect from illumination to glare. In addition, for a string light of the same length, the number of the light sources 3 and the number of the rubber beads 6 are increased, resulting in increase of production costs. If the ratio is less than 1/6, although the number of the light sources 3 and the number of the rubber beads 6 on a string light of the same length are decreased, which in turn saves the costs, every two light sources 3 are too far, the illumination effect and the visual effect are too poor, and the light is dark, which may weaken the atmosphere and may also reduce the market demands. Therefore, the optimal ratio of the width of each rubber bead 6 to the distance between the rubber beads 6 is 1/6, which achieves the optimal illumination effect and visual effect with proper costs. A reinforcing strip 5 arranged as a spiral ring is disposed on an inner wall of the rubber wire conduit 4. The dual-bead rubber-covered string light according to the present disclosure has a strong break-proof effect. By means of the reinforcing strip 5, the stability effect may be further strengthened on the basis of an original break-proof elect of the rubber wire conduit 4, such that the dual-bead rubber-covered string light is not prone to break even in long-term use or when frequently bent, and the service life of the dual-bead rubber-covered string light is effectively prolonged. A middle part of each rubber bead 6 bulges, two ends of each rubber bead are flat, and each rubber bead is elliptical. The rubber beads 6 are transparent or semitransparent. The two wrapping ends of each rubber bead 6 wrap corresponding ends of the rubber wire conduit 4. By means of the elliptical full wrapping structure, the light sources 3 and the wire 2 may be completely wrapped, and the ends of the rubber wire conduit 4 are also wrapped, such that the light sources 3 and the wire 2 are well protected against damage, and a waterproof effect is also achieved to a certain extent. At the same time, the rubber beads 6 may achieve 360° glowing, with a good glowing effect. As the rubber beads 6 are transparent or semitransparent, it is convenient to observe the illumination condition of the light sources 3, which is conducive to finding a damaged light source 3 immediately. The light sources 3 are evenly disposed on the wire 2, and each light source 3 is dual beads. Compared with existing rubber-covered string lights, the dual-bead rubber-covered string light according to the present disclosure are of a dual-bead type, such that the produced string light has richer expression forms and desirable glowing effect. The plug 1 is provided with an integrally-molded binding post 8. The tail end of the wire 2 is provided with a connector 9. The connector 9 is capable of being plugged into the binding post 8 in a matched manner. An outer wall of the binding post 8 is provided with a thread. A fastening sleeve 10 is movably fixed to the connector 9. An inner wall of the fastening sleeve 10 is provided with an internal thread capable of being connected to the binding post 8 in a rotary fit manner. In use, a user plugs the connector 9 into the binding post 8, and screws and fixes the fastening sleeve 10 to the binding post 8 for firm connection, and at the same time, a waterproof property is achieved to a certain extent. When disassembly is required, the user unscrews the fastening sleeve 10 from the binding post 8 and then pulls the connector 9 out of the binding post. The connector 9 is provided with a groove 11 along an outer wall. The connector 9 is provided with a step surface used for limiting the depth at which the connector 9 is plugged into the binding post 8. The groove 11 is provided in an end, capable of being plugged into the binding post 8, of the connector 9 and is attached to the step surface. A sealing bulb tube 12 is disposed in the groove 11. A reinforcing bulb tube 13 is disposed in the sealing bulb tube 12. A gap is reserved between the reinforcing bulb tube 12 and the sealing bulb tube 13. Therefore, the strengthening, fixing and waterproof effects are further achieved, and short circuits or damage of the string light caused by rainwater immersion may be avoided. The plug 1 is provided with a button 7 capable of switching lighting modes of the light sources 3. By means of the button 7 on the plug 1, the string light may be controlled to realize various lighting modes, and at the same time, a control method is simple and easy to implement. The present disclosure has simple structure, easy production and handy operation, and overcomes the defects of existing rubber-covered string lights.

The above are only preferred embodiments of the present disclosure and are not intended to limit the present disclosure. The usual changes and substitutions made by persons skilled in the art within the scope of the technical solution of the present disclosure shall fall within the scope of protection of the present disclosure.

What is claimed is:

1. A dual-bead rubber-covered string light, comprising a plug, a wire, and light sources, wherein the light sources are connected to the wire, a tail end of the wire is connected to the removable plug, a rubber wire conduit wrapping the wire is disposed on an outer wall of the wire, rubber beads wrapping the light sources by hot melting are disposed outside the light sources, and a ratio of a width of each rubber bead to a distance between the rubber beads is 1/6;

wherein a reinforcing strip arranged as a spiral ring is disposed on an inner wall of the rubber wire conduit; and a middle part of each rubber bead bulges, two ends of each rubber bead are flat, and each rubber bead is elliptical.

2. The dual-bead rubber-covered string light according to claim 1, wherein the rubber beads are transparent or semitransparent.

3. The dual-bead rubber-covered string light according to claim 2, wherein the two wrapping ends of each rubber bead wrap corresponding ends of the rubber wire conduit.

4. The dual-bead rubber-covered string light according to claim 1, wherein the light sources are evenly disposed on the wire, and each light source is dual beads.

5. The dual-bead rubber-covered string light according to claim 1, wherein the plug is provided with an integrally-molded binding post, the tail end of the wire is provided with a connector, and the connector is capable of being plugged into the binding post in a matched manner; and an outer wall of the binding post is provided with a thread, a fastening sleeve is movably fixed to the connector, and an inner wall of the fastening sleeve is provided with an internal thread capable of being connected to the binding post in a rotary fit manner.

6. The dual-bead rubber-covered string light according to claim 5, wherein the connector is provided with a groove along an outer wall, a sealing bulb tube is disposed in the groove, a reinforcing bulb tube is disposed in the sealing bulb tube, and a gap is reserved between the reinforcing bulb tube and the sealing bulb tube.

7. The dual-bead rubber-covered string light according to claim 1, wherein the plug is provided with a button capable of switching lighting modes of the light sources.

* * * * *